United States Patent
Kitakaze

(10) Patent No.: US 12,269,111 B2
(45) Date of Patent: Apr. 8, 2025

(54) MACHINE TOOL AND CONTROL METHOD OF MACHINE TOOL

(71) Applicant: CITIZEN WATCH CO., LTD., Tokyo (JP)

(72) Inventor: Ayako Kitakaze, Tokyo (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 241 days.

(21) Appl. No.: 17/923,643

(22) PCT Filed: Jun. 28, 2021

(86) PCT No.: PCT/JP2021/024277
§ 371 (c)(1),
(2) Date: Nov. 7, 2022

(87) PCT Pub. No.: WO2022/004625
PCT Pub. Date: Jan. 6, 2022

(65) Prior Publication Data
US 2023/0182230 A1  Jun. 15, 2023

(30) Foreign Application Priority Data

Jun. 30, 2020 (JP) .................................. 2020-112424

(51) Int. Cl.
| | |
|---|---|
| *B23K 20/00* | (2006.01) |
| *B23K 20/12* | (2006.01) |
| *B23Q 17/22* | (2006.01) |

(52) U.S. Cl.
CPC ........ *B23K 20/123* (2013.01); *B23K 20/1205* (2013.01); *B23K 20/125* (2013.01);
(Continued)

(58) Field of Classification Search
CPC .... B23K 20/12; B23K 20/121; B23K 20/129; B23K 20/1205; B23K 13/015; B23K 20/028
See application file for complete search history.

(56) References Cited

U.S. PATENT DOCUMENTS 3,541,669 A * 11/1970 Yocum ................. B23K 20/121
                                                228/103
3,712,528 A *  1/1973 Takagi ................. B23K 20/121
                                                137/487
(Continued)

FOREIGN PATENT DOCUMENTS

| EP | 3 009 222 A1 | 4/2016 |
|---|---|---|
| JP | 48-28265 | 8/1973 |

(Continued)

OTHER PUBLICATIONS

International Search Report (PCT/ISA/210), issued in PCT/JP2021/024277, dated Aug. 31, 2021.
(Continued)

*Primary Examiner* — Erin B Saad
(74) *Attorney, Agent, or Firm* — CANTOR COLBURN LLP

(57) ABSTRACT

A machine tool and a control method for the machine tool, which determine the degree of misalignment during friction joint, are provided. The machine tool (an automatic lathe 1) includes: a first spindle 10 rotatably holding a first workpiece (a workpiece W1); a second spindle 20 arranged to face the first spindle and rotatably holding a second workpiece (a remaining workpiece W2); and a controller 40a, while rotating at least one of the first workpiece or the second workpiece, relatively moving the first spindle and the second spindle so as to get closer to each other and pushing a rear end portion of the second workpiece against a front end portion of the first workpiece to frictionally join the first (Continued)

and second workpieces. The controller has a misalignment amount detector detecting a misalignment amount s of the second workpiece with respect to the first workpiece during the friction joint.

7 Claims, 7 Drawing Sheets

(52) U.S. Cl.
CPC .......... *B23K 20/1255* (2013.01); *B23Q 17/22* (2013.01); *B23Q 2717/003* (2013.01); *B23Q 2735/062* (2013.01)

(56) References Cited

U.S. PATENT DOCUMENTS

| | | | | |
|---|---|---|---|---|
| 3,725,998 | A | 4/1973 | Searle | |
| 4,757,932 | A * | 7/1988 | Benn ................ | B23K 20/121 228/113 |
| 5,858,142 | A * | 1/1999 | Tully ................ | B23K 20/121 228/114.5 |
| 7,651,019 | B2 * | 1/2010 | Kyriakoglou ......... | B23K 20/12 228/2.1 |
| 2006/0196916 | A1 * | 9/2006 | Goldstein .............. | B23K 20/12 228/114.5 |
| 2007/0051776 | A1 * | 3/2007 | Estes .................... | B23K 20/129 228/101 |
| 2007/0164078 | A1 | 7/2007 | Bayer | |
| 2009/0242613 | A1 * | 10/2009 | Kawaura .............. | B23K 13/015 228/2.1 |
| 2015/0298249 | A1 * | 10/2015 | Büchler ................. | B29C 65/06 228/104 |
| 2016/0039043 | A1 * | 2/2016 | Bray ...................... | B23K 20/12 228/2.1 |
| 2016/0228979 | A1 * | 8/2016 | Bray ...................... | B23K 20/24 |
| 2018/0036834 | A1 * | 2/2018 | Menzinger ........... | B23K 20/129 |
| 2021/0129262 | A1 | 5/2021 | Nakaya | |
| 2022/0126393 | A1 * | 4/2022 | Kitakaze ........... | B23Q 17/2283 |

FOREIGN PATENT DOCUMENTS

| | | |
|---|---|---|
| JP | 5-177384 A | 7/1993 |
| JP | 5-208281 A | 8/1993 |
| JP | 7-195183 A | 8/1995 |
| WO | WO 2019/102808 A1 | 5/2019 |

OTHER PUBLICATIONS

Written Opinion of the International Searching Authority (PCT/ISA/237), issued in PCT/JP2021/024277, dated Aug. 31, 2021.

Searle, J. "Friction Welding Non-Circular Components Using Oribital Motion", Welding and Metal Fabrication, Aug. 1971, pp. 294-297.

* cited by examiner

MACHINE TOOL AND CONTROL METHOD OF MACHINE TOOL

TECHNICAL FIELD

The present invention relates to a machine tool for joining two workpieces into one workpiece and relates to a control method for the machine tool.

BACKGROUND ART

In machine tools, material may be left unmachined. Due to such remaining material, it is difficult to reduce material costs and to contribute to environmental conservation. Therefore, it is conceivable to frictionally join a predetermined workpiece and the remaining workpiece to make the most effective use of materials.

When the workpiece and the remaining workpiece are frictionally joined, misalignment may occur between the workpiece and the remaining workpiece. Therefore, for example, in the patent literatures 1 and 2, techniques for detecting whether misalignment occurs during friction joint or not are disclosed.

CITATION LIST

Patent Literature

[Patent Literature 1] JP 05-208281 A
[Patent Literature 2] JP 07-195183 A

SUMMARY OF INVENTION

Technical Problem

However, with the techniques described in the patent literatures 1 and 2, although it can be detected whether misalignment occurs during friction joint or not, the degree of misalignment cannot be determined during friction joint.

The present invention has been made in view of such actual circumstances, and it is an object of the present invention to provide a machine tool and a control method for the machine tool, which can determine the degree of misalignment during friction joint.

Solution to Problem

Firstly, the present invention is directed to a machine tool comprising: a first spindle for rotatably holding a first workpiece; a second spindle arranged so as to face the first spindle and rotatably holding a second workpiece; and a control section (controller), while rotating at least one of the first workpiece held by the first spindle or the second workpiece held by the second spindle, relatively moving the first spindle and the second spindle so as to get closer to each other and pushing a rear end portion of the second workpiece against a front end portion of the first workpiece to frictionally join the first and second workpieces, wherein the control section has misalignment amount detecting means (misalignment amount detector) detecting a misalignment amount of the second workpiece with respect to the first workpiece during the friction joint.

Secondly, in the present invention, the machine tool further comprises second spindle moving means (second spindle mover) moving the second spindle in a direction intersecting a rotation axis of the second spindle during the friction joint on the basis of the misalignment amount of the second workpiece with respect to the first workpiece, which is detected by the misalignment amount detecting means.

Thirdly, in the present invention, a timing at which the second spindle is moved in the direction intersecting the rotation axis of the second spindle is immediately after the first spindle stops rotating, immediately before the first spindle stops rotating, or while rotation speed of the first spindle is gradually decreasing.

Fourthly, in the present invention, the control section has misalignment direction detecting means (misalignment direction detector) detecting a misalignment direction of the second workpiece with respect to the first workpiece during the friction joint by comparing the misalignment amount of the second workpiece with respect to the first workpiece, which is detected by the misalignment amount detecting means, and a rotation phase of the first spindle.

Fifthly, in the present invention, the second spindle moving means moves the second spindle in the direction intersecting the rotation axis of the second spindle so as to decrease the misalignment amount of the second workpiece with respect to the first workpiece on the basis of the misalignment amount of the second workpiece with respect to the first workpiece, which is detected by the misalignment amount detecting means, and the misalignment direction of the second workpiece with respect to the first workpiece, which is detected by the misalignment direction detecting means.

Sixthly, in the present invention, the misalignment amount detecting means obtains the misalignment amount of the second workpiece with respect to the first workpiece on the basis of a load applied to a motor for moving the second spindle in the direction intersecting the rotation axis of the second spindle.

Seventhly, in the present invention, the misalignment amount detecting means obtains the misalignment amount of the second workpiece with respect to the first workpiece on the basis of an output value of an optical sensor for measuring distance to the second workpiece.

Eighthly, the present invention is directed to a control method of a machine tool including: a first spindle rotatably holding a first workpiece; a second spindle arranged so as to face the first spindle and rotatably holding a second workpiece transferred from the first spindle; and a control section (controller) controlling operation of the first spindle and the second spindle, the control method comprising the steps of: while rotating at least one of the first workpiece held by the first spindle or the second workpiece held by the second spindle, relatively moving the first spindle and the second spindle so as to get closer to each other and bringing a rear end portion of the second workpiece into contact with a front end portion of a newly supplied first workpiece to generate friction; detecting a misalignment amount of the second workpiece with respect to the first workpiece during friction joint by pushing the rear end portion of the second workpiece against the front end portion of the first workpiece; detecting a misalignment direction of the second workpiece with respect to the first workpiece during the friction joint; and moving the second spindle in a direction intersecting a rotation axis of the second spindle during the friction joint so as to decrease the misalignment amount of the second workpiece with respect to the first workpiece on the basis of the detected misalignment amount of the second workpiece with respect to the first workpiece and the detected misalignment direction of the second workpiece with respect to the first workpiece.

Advantageous Effect of Invention

The present invention can obtain the following effects.

The degree of misalignment between the first workpiece and the second workpiece can be determined by the misalignment amount detecting means during the friction joint of the first workpiece and the second workpiece. Therefore, since the desired operation (for example, elimination of misalignment) can be performed before the friction joint is completed, it is not necessary to confirm the misalignment, correct the misaligned workpiece or the like after the friction joint. In addition, for example, deburring of the joint portion can be started quickly. As a result, it is possible to reduce manufacturing costs of products and stabilize quality.

DESCRIPTION OF EMBODIMENTS

Example 1

Hereinafter, a machine tool and a method for controlling the machine tool according to the first example of the present invention will be described with reference to drawings.

Figure 1:
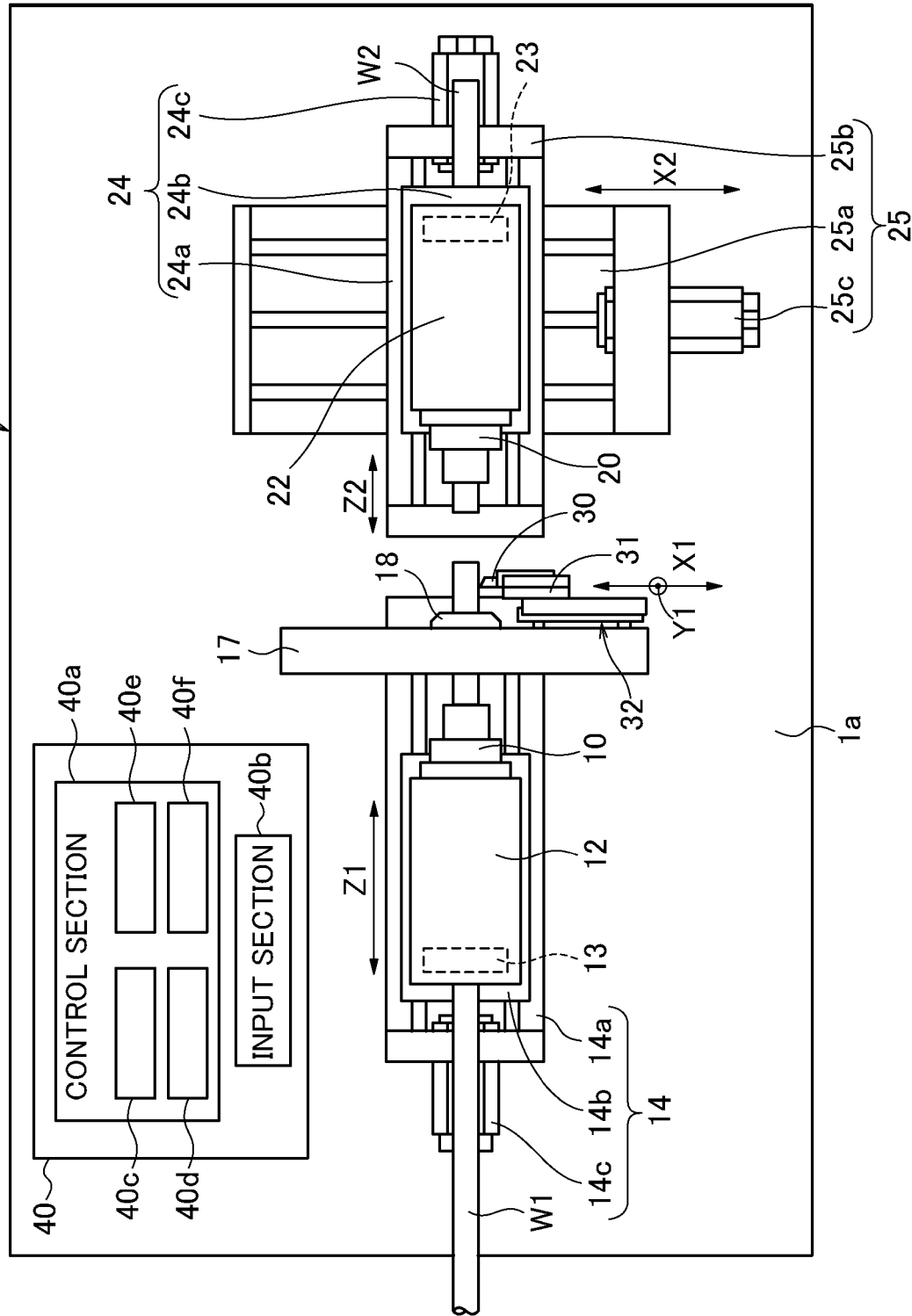
FIG. 1 is a schematic configuration diagram of an automatic lathe as the first example of a machine tool according to the present invention.

As shown in FIG. 1, an automatic lathe (machine tool) 1 comprises a first spindle 10 and a tool post 31. The first spindle 10 can grip (hold) a workpiece W1 via a chuck. This chuck is configured concentrically with the first spindle 10 and is rotatable integrally with the first spindle 10.

The workpiece W1 is a long round bar and is fed from the rear end of the first spindle 10 using a pushing member of a bar feeder. A finger chuck is provided at the tip of the pushing member, and the finger chuck grips the rear end of the workpiece W1.

The first spindle 10 is rotatably supported by a spindle headstock 12 with the Z1 axis direction shown in FIG. 1 as the rotation axis, and is rotationally driven by the power of a spindle motor 13 provided on the spindle headstock 12.

The spindle headstock 12 is mounted on a 1-axis direction feeding mechanism 14 and is movable in the Z1-axis direction.

The Z1-axis direction feeding mechanism 14 has a Z1-axis rail 14a, which is fixed to a bed 1a and extends in the Z1-axis direction. A Z1-axis slider 14b, which slides along the Z1-axis direction by a Z1-axis motor 14c, is mounted on the Z1-axis rail 14a. The spindle headstock 12 is provided on the Z1-axis slider 14b.

A guide bush 18 is provided in front of the spindle headstock 12 to support the cutting position. The guide bush 18 is supported by a support base 17, and the support base 17 is fixed to the bed 1a. The workpiece W1 is rotatably supported by the guide bush 18 around the Z1 axis and fed to the front side of the support base 17.

In this way, if the guide bush 18 is provided in front of the first spindle 10, the material from the vicinity of the tip of the first spindle 10 to the guide bush 18 becomes a remaining workpiece W2 that cannot be cut. By joining the remaining workpiece W2 and the newly supplied workpiece W1, the material can be effectively used, and the material costs can be reduced.

A moving table 32 is provided on the front side of the support base 17. The moving table 32 moves the tool post 31 in the X1-axis direction orthogonal to the Z1-axis direction and in the Y1-axis direction orthogonal to the Z1-axis and X1-axis directions.

A tool 30 is mounted on the tool post 31 with the tip of the tool 30 directed in the X1-axis direction. The workpiece W1 can be machined with the tool 30 by moving the first spindle 10 in the Z1-axis direction and moving the tool post 31 in the X1-axis direction or the Y1-axis direction.

The automatic lathe 1 comprises a second spindle 20 at a position facing the first spindle 10. The second spindle 20 can grip (hold) the remaining workpiece W2 via a chuck. This chuck is configured concentrically with the second spindle 20 and is rotatable integrally with the second spindle 20.

The remaining workpiece W2 is, for example, a round bar having the same diameter as the workpiece W1, and is a remaining material in the first spindle 10 that could not be machined. The remaining workpiece W2 is, for example, transferred from the first spindle 10 to the second spindle 20 and then held by the second spindle 20.

The second spindle 20 is rotatably supported by a spindle headstock 22 with the Z2 axis direction parallel to the Z1-axis direction as the rotation axis, and is rotationally driven by the power of a spindle motor 23 provided on the spindle headstock 22. The spindle headstock 22 is mounted on a Z2-axis direction feeding mechanism 24 and an X2-axis direction feeding mechanism 25 and is movable in the Z2-axis direction and the X2-axis direction.

The Z2-axis direction feeding mechanism 24 has a Z2-axis rail 24a, which, for example, is arranged on the X2-axis direction feeding mechanism 25 and extends in the Z2-axis direction. A Z2-axis slider 24b, which slides along the Z2-axis direction by a Z2-axis motor 24c, is mounted on the Z2-axis rail 24a. The spindle headstock 22 is provided on the Z2-axis slider 24b.

The X2-axis direction feeding mechanism 25 has an X2-axis rail 25a, which, for example, is fixed to the bed 1a and parallel to the X1-axis direction. An X2-axis slider 25b, which slides along the X2-axis direction by an X2-axis motor 25c, is mounted on the X2-axis rail 25a. The Z2-axis rail 24a of the Z2-axis direction feeding mechanism 24 is provided on the X2-axis slider 25b. The X2-axis direction feeding mechanism 25 corresponds to second spindle moving means (second spindle mover in the present invention), and the X2-axis motor 25c corresponds to a motor in the present invention.

Rotation of the first spindle 10 and the second spindle 20 and movement of the first spindle 10, the second spindle 20 and the moving table 32 are controlled by a control device (controller) 40. The control device 40 has a control section 40a and an input section 40b, which are connected with each other via a bus.

The control section 40a is composed of a CPU, a memory or the like, loads various programs and data stored in the ROM or the like into the RAM, and executes the program. Thereby, the operation of the automatic lathe 1 can be controlled on the basis of the program.

The rotation of the first spindle 10 and the second spindle 20, the movement of the first spindle 10, the second spindle 20 and the moving table 32 and the like can be set by a program or by inputting the rotation, the movement and the like to the input section 40b.

Further, the control section 40a functions as misalignment amount detecting means (misalignment amount detector) 40c, current value detecting means (current value detector) 40d, misalignment direction detecting means (misalignment direction detector) 40e and detecting means (rotation angle detector) 40f.

The current value detecting means 40d detects the load applied to the X2-axis motor 25c as a current value. While the rear end portion of the remaining workpiece W2 is pushed against the front end portion of the workpiece W1 to be integrally joined (an upsetting step U in FIG. 3), on the basis of the load detected by the current value detecting means 40d, the misalignment amount detecting means 40c obtains a misalignment amount s of the remaining workpiece W2 with respect to the integrally joined workpiece W1.

On the other hand, the rotation angle detecting means 40f detects a rotation phase of the first spindle 10. While the rear end portion of the remaining workpiece W2 is pushed against the front end portion of the workpiece W1 to be integrally joined (the upsetting step U in FIG. 3), by comparing the misalignment amount s obtained by the misalignment amount detecting means 40c with the rotation phase of the first spindle 10 detected by the rotation angle detecting means 40f, the misalignment direction detecting means 40e obtains the misalignment direction of the remaining workpiece W2 with respect to the integrally joined workpiece W1.

Figure 2:
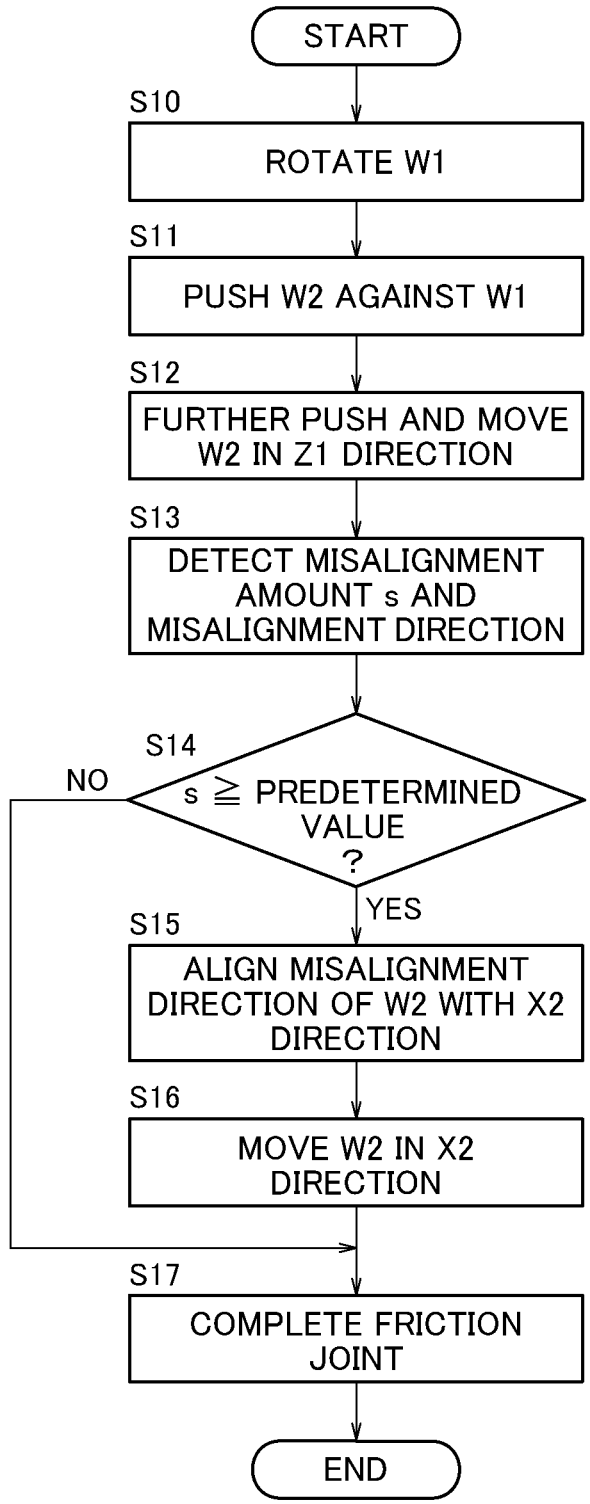
FIG. 2 is an operation flow chart including misalignment correction.
Figure 3:
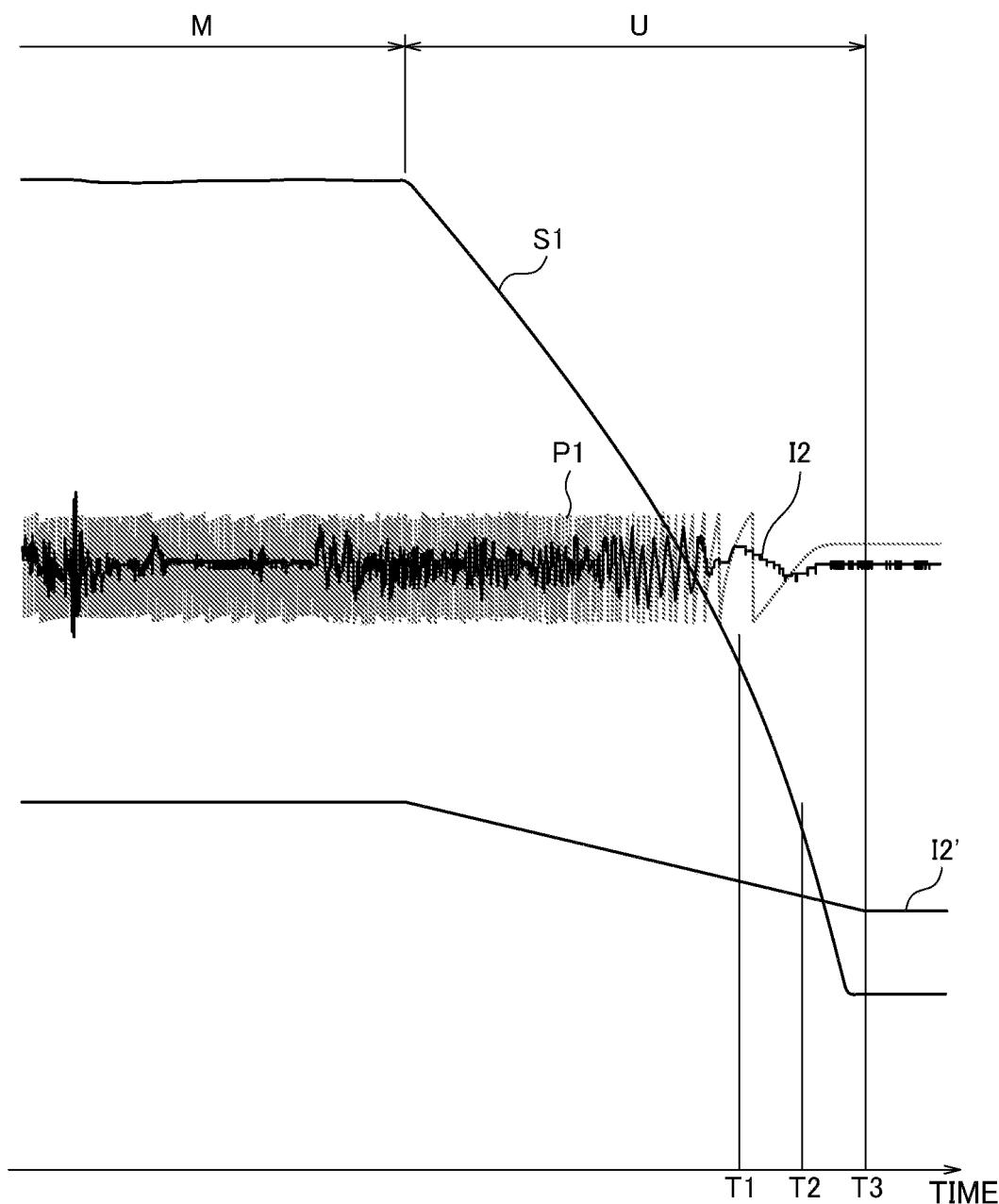
FIG. 3 is a diagram illustrating a rotation phase of the first spindle and a current value supplied to an X2-axis motor in friction joint.

FIG. 2 is an operation flowchart including misalignment correction, and FIG. 3 is a diagram for explaining rotation speed S1 and a rotation phase P1 of the first spindle 10 in friction joint (including a friction step M and the upsetting step U) and a current value I2 supplied to the X2-axis motor 25c.

In the automatic lathe 1 as shown in FIG. 1, the length of the workpiece W1 becomes short each time a cut-off process is performed. As machining of the workpiece W1 progresses, the overall length of the workpiece W1 held by the first spindle 10 becomes short to be from the vicinity of the tip of the first spindle 10 to the guide bush 18. This shortened portion becomes a remaining workpiece that cannot be cut. In the automatic lathe 1, the short workpiece held by the first spindle 10 is transferred to the second spindle 20 in order to effectively use the remaining workpiece.

Specifically, first, the axial center of the first spindle 10 and the axial center of the second spindle 20 are arranged concentrically, and for example, the second spindle 20 is brought closer to the first spindle 10. Next, the chuck of the first spindle 10 is opened, and the new workpiece W1 is supplied from behind the first spindle 10. Then, the newly supplied workpiece W1 is held by the first spindle 10. When this new workpiece W1 is supplied to the first spindle 10, the short workpiece that has been held by the first spindle 10 (which will eventually become the remaining workpiece W2) is pushed out of the guide bush 18 to the front side of the support base 17. Then, the remaining workpiece W2 is held by the second spindle 20.

Next, for example, in a state where the first spindle 10 rotates but the second spindle 20 does not rotate (step S10 in FIG. 2), for example, the second spindle 20 is brought closer to the first spindle 10, and the rear end portion of the remaining workpiece W2 is pushed against the front end portion of the new workpiece W1 so as to apply a predetermined pressure (step S11: start of the friction step M). As a result, at the contact portion between the remaining workpiece W2 and the workpiece W1, frictional heat is generated due to the rotation speed difference between the first spindle 10 and the second spindle 20, and the contact portion is softened.

In the present example, only the first spindle 10 is rotated, but since it is only necessary that the first spindle 10 and the second spindle 20 rotate with different speeds, the second spindle 20 may also be rotated. In that case, the first spindle 10 may be rotated in the same direction as or in the opposite direction to the rotation direction of the second spindle 20. Alternatively, only the second spindle 20 may be rotated. Also, in the present example, only the second spindle 20 is moved in the Z2-axis direction. However, only the first spindle 10 may be moved in the Z1-axis direction, or both the first spindle 10 and the second spindle 20 may be moved to bring the rear end portion of the remaining workpiece W2 into contact with the front end portion of the workpiece W1.

Subsequently, when the contact portion between the remaining workpiece W2 and the workpiece W1 is softened to the required degree, stronger pressure is applied to push the remaining workpiece W2 against the workpiece W1 so as to bring the second spindle 20 even closer to the first spindle 10 (Step S12: End of the friction step M, start of the upsetting step U). At the same time, the control section 40a outputs a rotation stop command to the first spindle 10. As a result, as shown in FIG. 3, the rotation speed S1 of the first spindle 10 is gradually reduced.

In the present embodiment, an example has been described in which timing of outputting the rotation stop command and timing of applying the stronger pressure to push the remaining workpiece W2 against the workpiece W1 are same as each other, but these timing may be different.

Further, as a method of confirming the degree of softening, for example, it is possible to obtain the degree of softening by detecting decrease in the current value of the Z2-axis motor 24c (indicated by I2' in FIG. 3). Further, it is also possible to determine in advance the condition for softening the contact portion by a preliminary experiment and, on the basis of this condition, apply friction to the contact portion between the remaining workpiece W2 and the workpiece W1.

If the rotation of the first spindle 10 stops while the second spindle 20 is being pushed against the first spindle 10, the rear end portion of the remaining workpiece W2 is pushed and joined with the front end portion of the workpiece W1 and the remaining workpiece W2 and the workpiece W1 are integrated.

Here, there is a case where the remaining workpiece W2 and the workpiece W1 are integrated with each other in a misalignment state. However, even if the remaining workpiece W2 is misaligned with respect to the workpiece W1, since the temperature of the contact portion between the remaining workpiece W2 and the workpiece W1 is high in the upsetting step U, it has been found that the remaining workpiece W2 can be moved in a direction intersecting the axial center of the remaining workpiece W2. Therefore, as described below, misalignment correction is performed during friction joint (before the joining phenomenon is completed).

Figure 4:
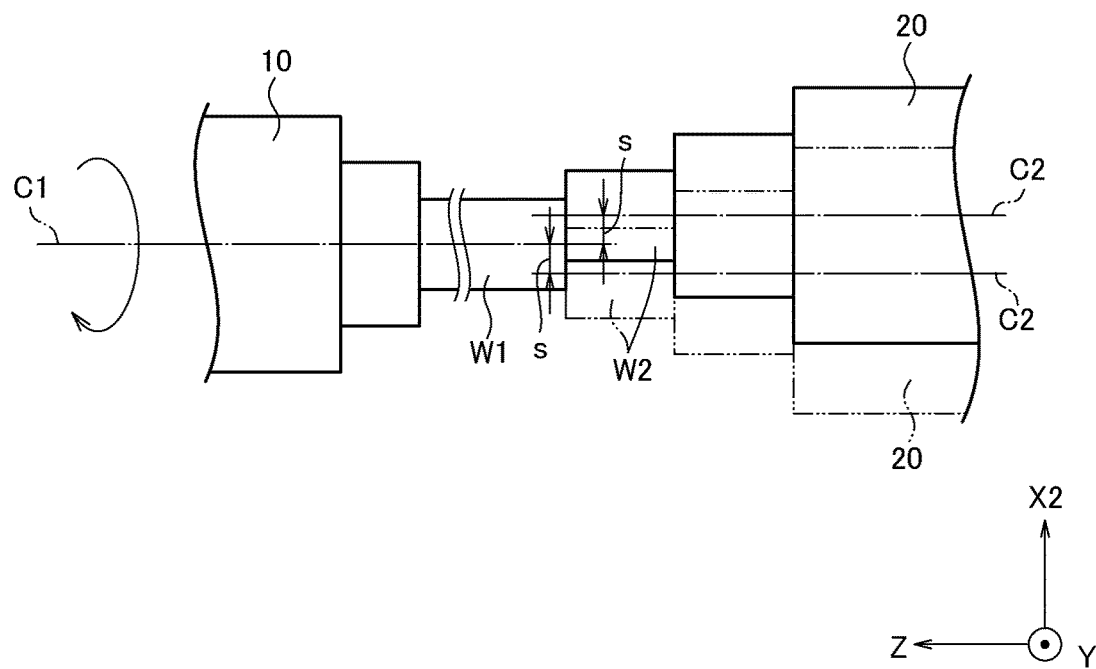
FIG. 4 is a diagram illustrating deflection of a remaining workpiece due to misalignment.

Specifically, after the remaining workpiece W2 is pushed against the rotating workpiece W1 (step S11 in FIG. 2), in a state where the workpiece W1 is held by the first spindle 10 and the remaining workpiece W2 is held by the second spindle 20, if only the first spindle 10 is rotationally driven, the rotation of the first spindle 10 is transmitted to the second spindle 20 via the workpiece W1 and the remaining workpiece W2, so that the second spindle 20 is also rotated together. When misalignment occurs between the remaining workpiece W2 and the workpiece W1, the second spindle 20 vibrates in the X2-axis direction with amplitude twice the misalignment amount s (the distance between the axial center C1 of the workpiece W1 and the axial center C2 of the remaining workpiece W2) with respect to the axial center C1 of the first spindle 10, which is indicated by the solid line and the two-dot chain line in FIG. 4.

On the other hand, the position of the second spindle 20 in the X2-axis direction is determined by the X2-axis motor 25c, and the X2-axis motor 25c is controlled by the control section 40a to determine the position of the second spindle 20 in the X2-axis direction. (The X2-axis motor 25c is in a rotationally driven state.) Therefore, if vibration due to misalignment is applied to the X2-axis motor 25c, the current value I2 supplied from the control section 40a to the X2-axis motor 25c increases or decreases according to the rotation phase of the second spindle 20.

Figure 5:
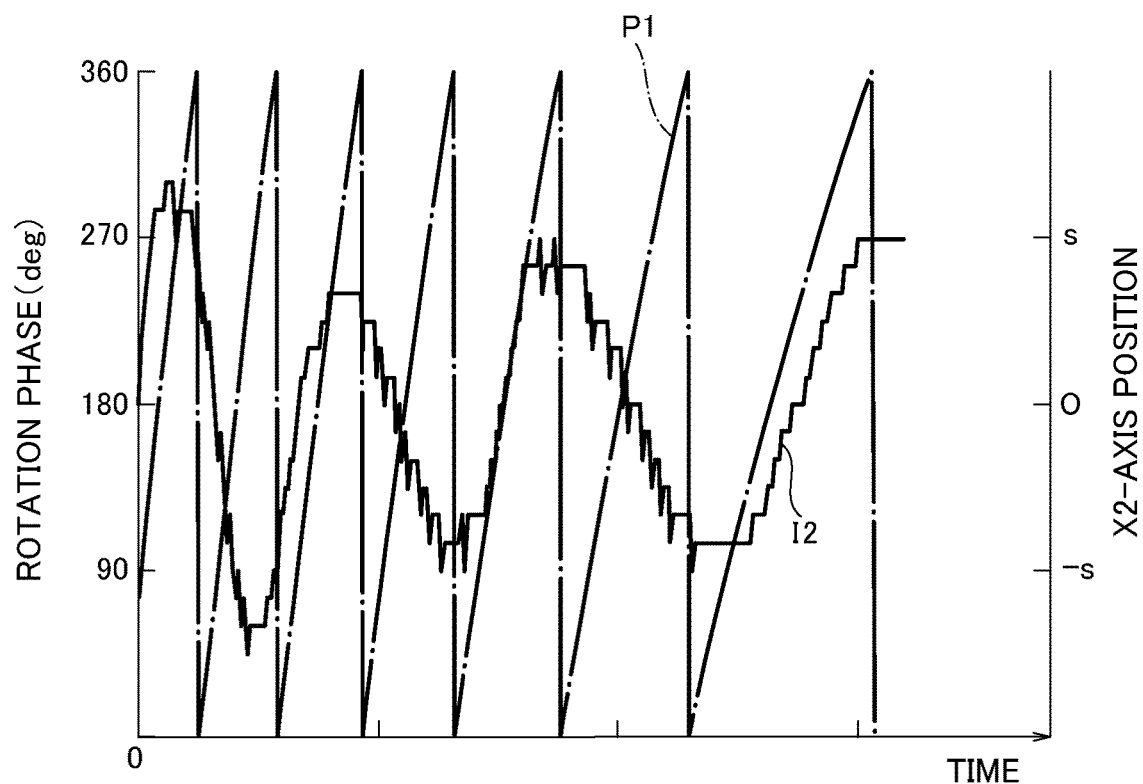
FIG. 5 is a diagram illustrating the rotation phase of the first spindle and the current value supplied to the X2-axis motor in an upsetting step.

Specifically, if vibration with amplitude twice the misalignment amount s is applied to the X2-axis motor 25c, the current value I2 supplied to the X2-axis motor 25c fluctuates with amplitude corresponding to twice the amplitude of the misalignment amount s during the upsetting step U, which is indicated by the solid line in the graph with X2-axis position (vertical axis) and time (horizontal axis) in FIG. 5.

Then, the current value detecting means 40d detects the fluctuation range (difference between the maximum value and the minimum value) of the current value I2 supplied to the X2-axis motor 25c, for example, over a predetermined period. Then, the misalignment amount detecting means 40c obtains, for example, the average value of the fluctuation range of the current value I2, and, by hypothesizing that the half value of this average value corresponds to the misalignment amount s, detects the misalignment amount s of the remaining workpiece W2 with respect to the integrally jointed workpiece W1 (step S13 in FIG. 2).

In this way, by the misalignment amount detecting means 40c, the degree of misalignment between the workpiece W1 and the remaining workpiece W2 can be determined during the friction joint of the workpiece W1 and the remaining workpiece W2. Thus, as will be described later, since the desired operation (for example, elimination of misalignment) can be performed before the friction joint is completed, it is not necessary to confirm the misalignment, correct misaligned workpiece or the like after the friction joint. In addition, for example, deburring operation can be started quickly. As a result, it is possible to reduce manufacturing costs of products and stabilize quality.

Further, by using the load applied to the X2-axis motor 25c, the misalignment amount s of the remaining workpiece W2 with respect to the workpiece W1 can be obtained easily and accurately.

In the present example, an example in which the load applied to the X2-axis motor 25c is obtained from the average value of the fluctuation range of the current value I2 has been described, but the present invention is not limited to this example. For example, reference values for a fluctuation range of the current value I2 or for fluctuation of the current value I2 may be set only for predetermined timing, and an increase or decrease amount with respect to this reference value is used. Also, other parameters based on the current value I2 may be used.

On the other hand, the fluctuation (maximum value and minimum value) of the current value I2 supplied to the X2-axis motor 25c occurs substantially at the same rotation phase of the workpiece W1. Therefore, by comparing the fluctuation of the current value I2 with the rotation phase P1 of the first spindle 10, the misalignment direction of the remaining workpiece W2 with respect to the workpiece W1 can also be found.

Specifically, as shown in FIG. 5, the rotation phase P1 of the first spindle 10 (indicated by the dashed line in the figure) and the current value I2 supplied to the X2-axis motor 25c (indicated by the solid line in the figure) are, for example, in a relationship in which the X2-axis motor 25c rotates approximately once while the spindle motor 13 rotates twice. If the remaining workpiece W2 is misaligned with respect to the workpiece W1 in the positive direction of the X2 axis, the current value I2 supplied to the axis motor 25c increases in the positive direction. Further, when the rotation phase P1 of the first spindle 10 is, for example, 270°, the current value I2 supplied to the X2-axis motor 25c reaches the maximum value. Therefore, it can be seen that the misalignment direction of the remaining workpiece W2 is the direction connecting the axial center C1 of the first spindle 10 and the position of the rotation phase of 270°.

In step S13 of FIG. 2 (the upsetting step U of FIG. 3), the misalignment direction detecting means 40e detects the misalignment direction of the remaining workpiece W2 with respect to the workpiece W1 by comparing the misalignment amount s of the remaining workpiece W2 with respect to the workpiece W1, which is detected by the misalignment amount detecting means 40c, and the rotation phase P1 of the first spindle 10 detected by the rotation angle detecting means 40f. In this way, the misalignment direction of the remaining workpiece W2 with respect to the workpiece W1 can be obtained by the misalignment direction detecting means 40e during the friction joint of the workpiece W1 and the remaining workpiece W2.

Next, the control section 40a determines whether or not the misalignment amount s detected by the misalignment amount detecting means 40c is equal to or larger than a predetermined value at which misalignment correction is required (step S14 in FIG. 2). If the misalignment amount s detected by the misalignment amount detecting means 40c is equal to or larger than the predetermined value (YES in step S14), the process proceeds to step S15 to correct the misalignment. On the other hand, if the misalignment amount s detected by the misalignment amount detecting means 40c is less than the predetermined value (NO in step S14), the process proceeds to step S17.

Figure 6A:
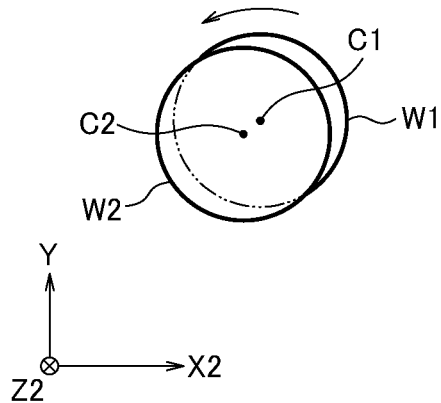
FIG. 6A is a diagram illustrating misalignment of the remaining workpiece with respect to a joined workpiece.

If the misalignment correction is required (YES in step S14), the control section 40a outputs a drive signal to the spindle motor 13 to align the misalignment direction of the remaining workpiece W2 with respect to the workpiece W1 with the X2 direction (step S15). Specifically, as shown in FIG. 6A, if the misalignment direction of the remaining workpiece W2 with respect to the workpiece W1 (the direction connecting the axial center C1 of the workpiece W1 and the axial center C2 of the remaining workpiece W2) is not parallel to the X2 axis, the first spindle 10 is rotated to align the misalignment direction with the X2-axis direction.

Figure 6B:
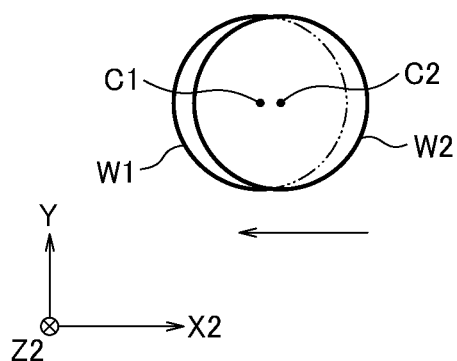
FIG. 6B is a diagram illustrating operation of aligning a misalignment direction with the X2-axis direction.
Figure 6C:
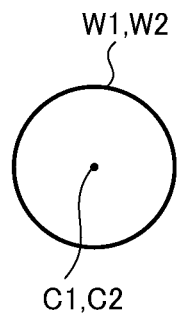
FIG. 6C is a diagram illustrating operation to eliminate misalignment.

Next, for example, immediately after the first spindle 10 stops rotating (indicated by time T3 in FIG. 3), the control section 40a outputs a drive signal to the X2-axis motor 25c to move the second spindle 20 in the X2-axis direction in which the misalignment amount s decreases as indicated by the arrow in FIG. 6B (step S16 in FIG. 2). More specifically, the second spindle 20 is moved in the direction, in which the distance from the axial center C2 of the remaining workpiece W2 to the axial center C1 of the workpiece W1 becomes short, by, for example, half the average value of the fluctuation range of the current value I2, so that the axial center of the remaining workpiece W2 and the axial center of the workpiece W1 correspond to each other (FIG. 6C). As a result, misalignment of the remaining workpiece W2 can be eliminated during the friction joint of the workpiece W1 and the remaining workpiece W2.

Subsequently, the control section 40a outputs a drive signal to the Z2-axis motor 24c to further push the rear end portion of the remaining workpiece W2 against the front end portion of the workpiece W1 to complete the friction joint (step S17 in FIG. 2).

At the timing of moving the second spindle 20 in the X2-axis direction (step S16), the temperature of the contact portion between the remaining workpiece W2 and the workpiece W1 is high, and it is only necessary that the remaining workpiece W2 is in a state of being able to be moved in a direction intersecting the axial center of the remaining workpiece W2. Therefore, in addition to the time T3 described above, for example, the timing may be immediately before the first spindle 10 stops rotating (indicated by time T2 in FIG. 3) or while the rotation speed S1 of the first spindle 10 is gradually decreasing (indicated by time T1).

After that, the tool 30 is used to cut off burrs generated at the joint portion between the remaining workpiece W2 and the workpiece W1. In this cutting-off process, while the workpiece W1 is held by the first spindle 10, holding of the remaining workpiece W2 by the second spindle 20 is released. The tool 30 is arranged, for example, closer to the second spindle 20 than the joint portion between the remaining workpiece W2 and the workpiece W1, and is set to a predetermined cutting amount. Then, while rotating the first spindle 10, the tool 30 is moved closer to the first spindle 10 than the joint portion between the remaining workpiece W2 and the workpiece W1 to deburr.

In this way, the front end portion of the workpiece W1 and the rear end portion of the remaining workpiece W2 are frictionally joined using the first spindle 10 and the second spindle 20 which are arranged so as to face each other. The manufacturing cost of products can be reduced by the automatic lathe 1 in which the joining process and the cutting process are combined (integrated).

In the above example, an example in which the misalignment amount detecting means 40c calculates the misalignment amount s has been described. However, the present invention can be applied to cases where, by taking a picture of the joining portion or the like with a camera or the like and performing image processing on the joining portion between the workpiece W1 and the remaining workpiece W2, or by measuring the joining portion using a laser as will be described later, misalignment amount of the remaining workpiece W2 with respect to the workpiece W1 is detected.

Further, in the above example, an example in which the misalignment amount s is eliminated has been described. However, the present invention is also applicable to cases where misalignment is not eliminated but the misalignment amount s is reduced.

Further, in the above example, an example in which the guide bush 18 is provided between the first spindle 10 and the second spindle 20 has been described. However, in the present invention, since it is only necessary to detect the misalignment amount s during the friction joint, the guide bush 18 can be omitted. Further, the workpiece W1 may be made of material different from that of the remaining workpiece W2. Further, the workpiece W1 and the remaining workpiece W2 may have different diameters. Furthermore, in the above example, an example in which the remaining workpiece W2 and the workpiece W1 are frictionally joined has been described, but the present invention is not limited to the example of joint of the remaining workpiece W2 and can also be applied to cases where new workpieces are joined together.

Further, in the present invention, it is only necessary that at least the first spindle 10 is rotatable about the Z1 axis, the second spindle 20 is rotatable about the Z2 axis, either the first spindle 10 or the second spindle 20 is movable in the Z1 axis direction or in the Z2 axis direction, and either the first spindle 10 or the second spindle 20 is movable in the X1 axis direction or in the X2 axis direction, and thus, the present invention is not limited to the configuration of the present example.

Further, in the above example, the movement is performed in the X2-axis direction perpendicular to the Z2-axis, but in the present invention, the moving direction can be changed as long as the moving direction intersects the Z2-axis.

Example 2

Next, a machine tool and a control method of the machine tool according to the second example of the present invention will be described with reference to drawings.

An automatic lathe (machine tool) 2 of the second example is an automatic lathe, in which the method of detecting the misalignment amount s of the remaining workpiece W2 with respect to the workpiece W1 is changed from that in the automatic lathe 1 of the first example.

Since many components of the automatic lathe 2 in the second example are common to those of the automatic lathe 1 in the first example, detailed description of the common components will be omitted.

Figure 7:
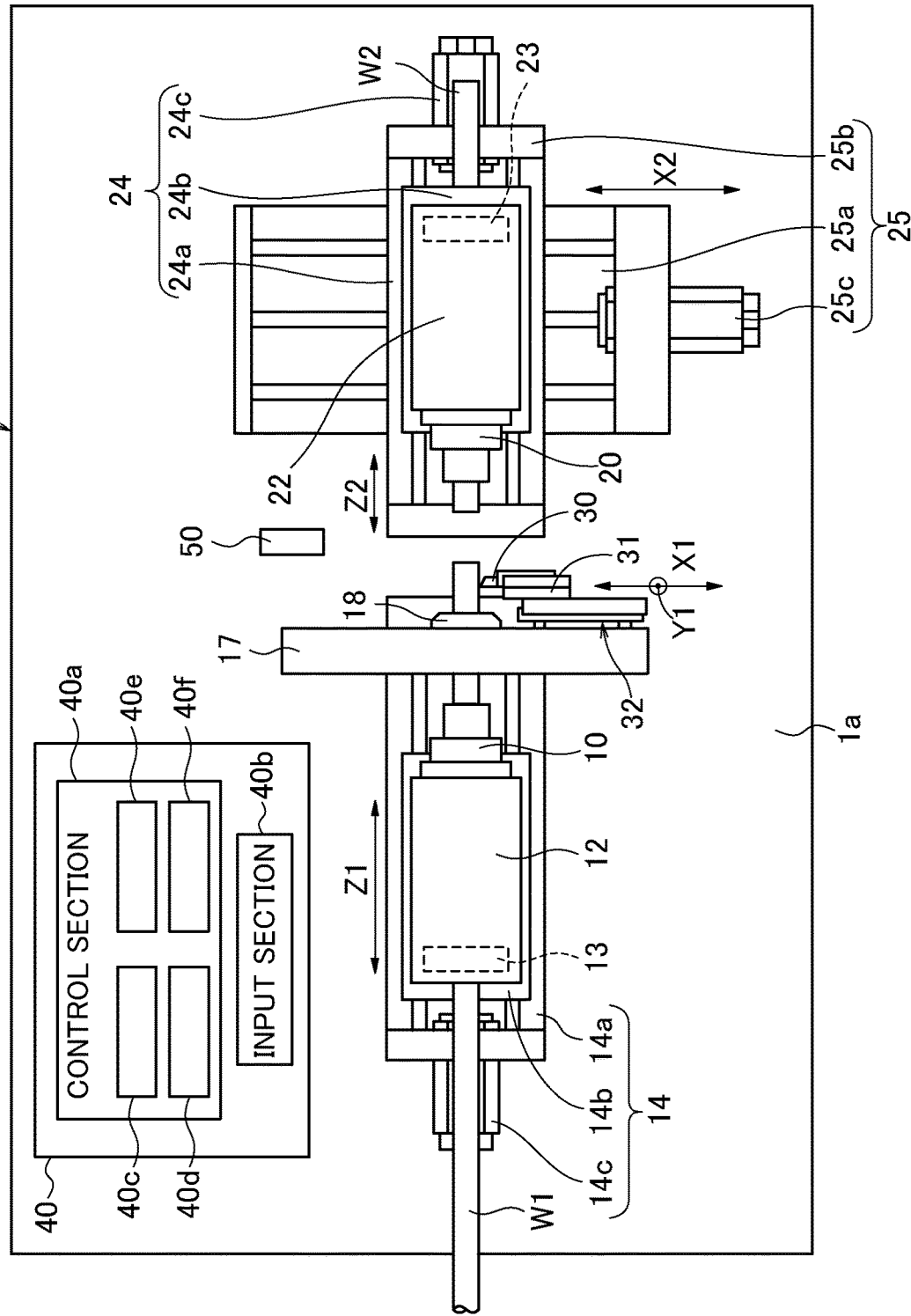
FIG. 7 is a schematic configuration diagram of an automatic lathe as the second example of a machine tool according to the present invention.
Figure 8:
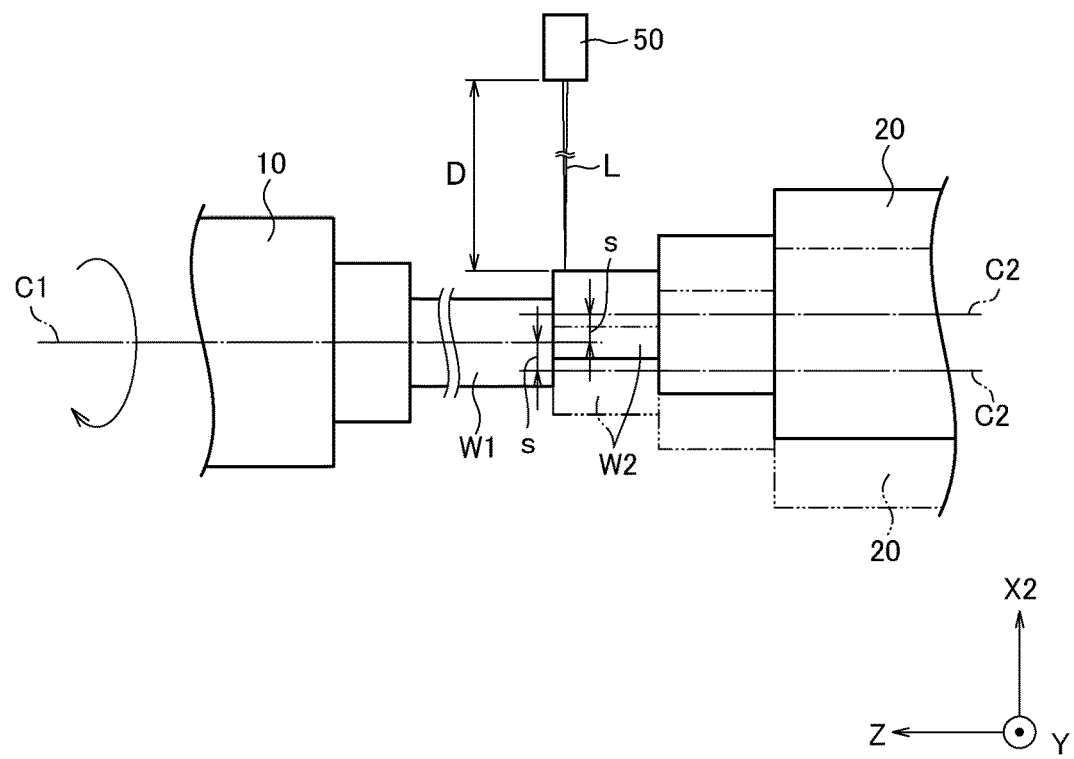
FIG. 8 is a diagram illustrating deflection of a remaining workpiece due to misalignment in the second example.

As shown in FIG. 7, the automatic lathe 2 has a laser sensor 50, which is a type of optical sensors controlled by the control device 40, on the bed 1a. As shown in FIG. 8, the laser sensor 50 irradiates the remaining workpiece W2 with laser light L in parallel with the X2 axis to detect distance D in the X2 axis direction between the laser sensor 50 and the peripheral surface of the remaining workpiece W2.

Next, detection of the misalignment amount s of the remaining workpiece W2 with respect to the workpiece W1 by the automatic lathe 2 in the second example will be described.

For example, if vibration with amplitude twice the misalignment amount s is applied to the remaining workpiece W2, the distance D between the laser sensor 50 and the peripheral surface of the remaining workpiece W2 fluctuates with amplitude twice the misalignment amount s during the upsetting step U with the distance O being the center of the fluctuation. Here, the distance O is the distance in the X2 axis direction between the laser sensor 50 and the peripheral surface of the workpiece W1, and this fluctuation is indicated by the solid line in the graph with distance (vertical axis) and time (horizontal axis) in FIG. 9.

Then, in the upsetting step U, the misalignment amount detecting means 40c detects the maximum value of the fluctuation value in the X2-axis direction of the peripheral surface of the remaining workpiece W2 with respect to the axial center C1 of the workpiece W1, that is, the misalignment amounts of the remaining workpiece W2 with respect to the integrally joined workpiece W1, on the basis of an output value D of the laser sensor 50 (the distance in the X2-axis direction between the laser sensor 50 and the peripheral surface of the remaining workpiece W2).

Next, detection of the misalignment direction of the remaining workpiece W2 with respect to the workpiece W1 in the automatic lathe 2 of the second example will be described.

Also in the second example, the fluctuation (maximum value and minimum value) of the output value D of the laser sensor 50 occurs substantially at the same rotation phase of the workpiece W1. Therefore, by comparing the fluctuation of the output value D with the rotation phase P1 of the first spindle 10, the misalignment direction of the remaining workpiece W2 with respect to the workpiece W1 can also be found.

Figure 9:
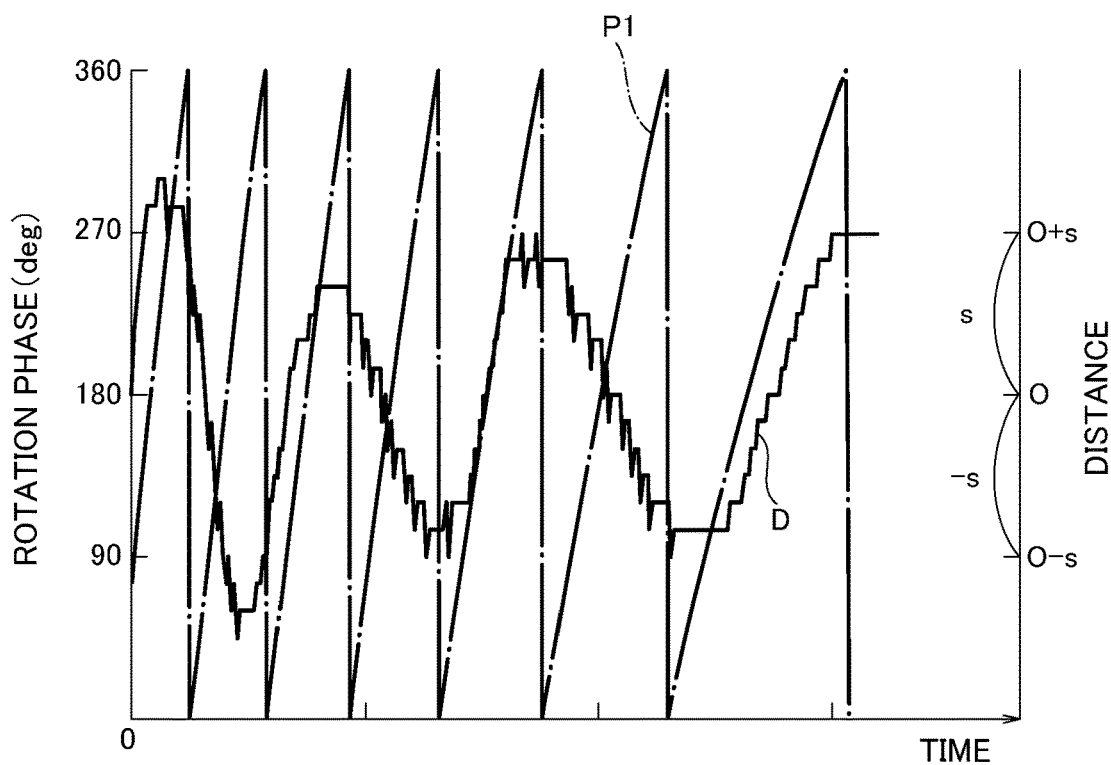
FIG. 9 is a diagram illustrating a rotation phase of the first spindle and fluctuation of distance between a laser sensor and a peripheral surface of the remaining workpiece in an upsetting step of the second example.

Specifically, as shown in FIG. 9, the rotation phase P1 of the first spindle 10 (indicated by the dashed line in the figure) and the output value D of the laser sensor 50 (indicated by the solid line in the figure) are, for example, in a relationship in which the remaining workpiece W2 rotates approximately once while the spindle motor 13 (that is, the workpiece W1) rotates twice. If the remaining workpiece W2 is misaligned with respect to the workpiece W1 in the positive direction of the X2 axis, the output value D of the laser sensor 50 increases in the positive direction. Further, when the rotation phase P1 of the first spindle 10 is, for example, 270°, the output value D of the laser sensor 50 reaches the maximum value. Therefore, it can be seen that the misalignment direction of the remaining workpiece W2 is the direction connecting the axial center C1 of the first spindle 10 and the position of the rotation phase of 270°.

Then, in the upsetting step U, as in the first example, the misalignment direction detecting means 40e detects the misalignment direction of the remaining workpiece W2 with respect to the workpiece W1 by comparing the misalignment amount s of the remaining workpiece W2 with respect to the workpiece W1, which is detected by the misalignment amount detecting means 40c, and the rotation phase P1 of the first spindle 10 detected by the rotation angle detecting means 40f, In this way, also in the automatic lathe 2 of the second example, the misalignment direction of the remaining workpiece W2 with respect to the workpiece W1 can be obtained by the misalignment direction detecting means 40e during the friction joint of the workpiece W1 and the remaining workpiece W2.

As described above, in the second example, the automatic lathe 2 comprises the laser sensor 50 for measuring the distance to the remaining workpiece W2, and the misalignment amount detecting means 40c obtains the misalignment amount s of the remaining workpiece W2 with respect to the workpiece W1 on the basis of the output value D of the laser sensor 50, so that the misalignment amount s can be directly detected from the shape of the peripheral surface of the remaining workpiece W2. Therefore, the misalignment amount s can be detected more accurately than cases where the misalignment amount s is indirectly detected on the basis of the load applied to X2 axis motor as in the first example.

In the present example, as shown in FIG. 8, the laser sensor 50 irradiates the remaining workpiece W2 with laser light in parallel with the X2 axis to detect the misalignment amount s and the misalignment direction of the remaining workpiece W2 with respect to the workpiece W1. However, the laser irradiation direction may be any direction as long as the misalignment amount s can be calculated by the misalignment amount detecting means 40c and is not limited to the direction parallel with the X2 axis.

Further, the present example is described with the laser sensor 50 using the laser light L as an example of optical sensors. However, the optical sensor is not limited to the laser sensor, and can be appropriately selected according to the measurement accuracy. For example, the sensor may be an optical sensor using emitted light such as LED light.

REFERENCE SIGNS LIST

1 automatic lathe (machine tool)
1a bed
10 first spindle
12 spindle headstock
13 spindle motor
14 Z1-axis direction feeding mechanism
14a Z1-axis rail
14b Z1-axis slider
14c Z1-axis motor
17 support base
18 guide bush
20 second spindle
22 spindle headstock
23 spindle motor
24 Z2-axis direction feeding mechanism
24a Z2-axis rail
24b Z2-axis slider
24c Z2-axis motor
25 X2-axis direction feeding mechanism (second spindle moving means)
25a X2-axis rail
25b X2-axis slider
25c X2-axis motor
30 tool
31 tool post
32 moving table
40 control device
40a control section
40b input section
40c misalignment amount detecting means (misalignment amount detector)
40d current value detecting means (current value detector)
40e misalignment direction detecting means (misalignment direction detector)
40f rotation angle detecting means (rotation angle detector)
50 laser sensor (optical sensor)
W1 workpiece (first workpiece)
W2 remaining workpiece (second workpiece)
M friction step
U upsetting step
S1 rotation speed
P1 rotation phase
I2 current value
T1 time
T2 time T3 time
s misalignment amount
D distance in X2 axis direction between laser sensor and peripheral surface of
remaining workpiece
L laser light

The invention claimed is:

1. A machine tool comprising:
a first spindle rotatably holding a first workpiece;
a second spindle arranged so as to face the first spindle and rotatably holding a second workpiece;
a controller, while rotating at least one of the first workpiece held by the first spindle or the second workpiece held by the second spindle, relatively moving the first spindle and the second spindle so as to get closer to each other and pushing a rear end portion of the second workpiece against a front end portion of the first workpiece to frictionally join the first and second workpieces; and
a spindle mover comprising a motor configured to move the second spindle in a direction intersecting a rotation axis of the second spindle,
wherein the controller has a misalignment amount detector detecting a misalignment amount of the second workpiece with respect to the first workpiece during the friction joint,
wherein the misalignment amount detector obtains the misalignment amount of the second workpiece with respect to the first workpiece on the basis of a load applied to the motor.

2. The machine tool according to claim 1, wherein the spindle mover is configured to move the second spindle in the direction intersecting the rotation axis of the second spindle during the friction joint on the basis of the misalignment amount of the second workpiece with respect to the first workpiece, which is detected by the misalignment amount detector.

3. The machine tool according to claim 2, wherein a timing at which the second spindle is moved in the direction intersecting the rotation axis of the second spindle is immediately after the first spindle stops rotating, immediately before the first spindle stops rotating, or while rotation speed of the first spindle is gradually decreasing.

4. The machine tool according to claim 2, wherein the controller has a misalignment direction detector detecting a misalignment direction of the second workpiece with respect to the first workpiece during the friction joint by comparing the misalignment amount of the second workpiece with respect to the first workpiece, which is detected by the misalignment amount detector, and a rotation phase of the first spindle.

5. The machine tool according to claim 4, wherein the second spindle mover moves the second spindle in the direction intersecting the rotation axis of the second spindle so as to decrease the misalignment amount of the second workpiece with respect to the first workpiece on the basis of the misalignment amount of the second workpiece with respect to the first workpiece, which is detected by the misalignment amount detector, and the misalignment direction of the second workpiece with respect to the first workpiece, which is detected by the misalignment direction detector.

6. A control method of a machine tool including:
a first spindle rotatably holding a first workpiece;
a second spindle arranged so as to face the first spindle and rotatably holding a second workpiece transferred from the first spindle;
a controller having a misalignment amount detector and controlling operation of the first spindle and the second spindle and
a spindle mover comprising motor configured to move the second spindle in a direction intersecting a rotation axis of the second spindle, the control method comprising the steps of:
while rotating at least one of the first workpiece held by the first spindle or the second workpiece held by the second spindle, relatively moving the first spindle and the second spindle so as to get closer to each other and pushing a rear end portion of the second workpiece against a front end portion of the first workpiece to frictionally join the first and second workpieces;
detecting, via the misalignment amount detector, a misalignment amount of the second workpiece with respect to the first workpiece during friction joint by pushing the rear end portion of the second workpiece against the front end portion of the first workpiece, the misalignment amount detector obtaining the misalignment amount of the second workpiece with respect to the first workpiece on the basis of a load applied to the motor;
detecting a misalignment direction of the second workpiece with respect to the first workpiece during the friction joint; and
moving the second spindle in a direction intersecting a rotation axis of the second spindle during the friction joint so as to decrease the misalignment amount of the second workpiece with respect to the first workpiece on the basis of the detected misalignment amount of the second workpiece with respect to the first workpiece and the detected misalignment direction of the second workpiece with respect to the first workpiece.

7. The machine tool according to claim 1, wherein the controller has a misalignment direction detector detecting a misalignment direction of the second workpiece with respect to the first workpiece during the friction joint by comparing the misalignment amount of the second workpiece with respect to the first workpiece, which is detected by the misalignment amount detector, and a rotation phase of the first spindle.

* * * * *